March 17, 1959   O. ALVISTUR   2,877,483
TOOTH BRUSH
Filed Dec. 6, 1957

INVENTOR.
OSCAR ALVISTUR
BY
Munn & Liddy
ATTORNEYS

United States Patent Office 2,877,483
Patented Mar. 17, 1959

2,877,483

TOOTH BRUSH

Oscar Alvistur, San Francisco, Calif.

Application December 6, 1957, Serial No. 701,135

4 Claims. (Cl. 15—210)

The present invention relates to improvements in a tooth brush; and it consists of the combinations, constructions and arrangement of parts, as hereinafter described and claimed.

An object of my invention is to provide a tooth brush in which a casing of soft material is provided on the head of the brush, this casing having a block of sponge rubber disposed therein. The casing is adapted to clean the teeth without injury to the person's gums, while the sponge rubber block will yield so as to allow the casing to flex so as to conform to the irregular surfaces of the teeth and thus promote the cleaning of the latter. Also, the sponge rubber block will collect the particles of food and the like removed from the teeth.

Another object of the invention is to provide a simple means for removably securing the casing and the sponge rubber block to the head, thus allowing a new casing and block to be substituted from time to time.

Other objects and advantages will appear as the specification proceeds. The novel features of the invention will be set forth in the claims hereunto annexed.

Drawing

For a better understanding of my invention, reference should be had to the accompanying drawing, forming part of this specification, in which.

While I have shown only the preferred form of my invention, it should be understood that various changes, or modifications, may be made within the scope of the appended claims without departing from the spirit thereof.

Detailed description

In carrying out my invention I provide a tooth brush having a head A, which has a handle B extending therefrom. A cleaning unit designated generally at C is removably secured to the head A by a mechanism indicated at D.

Figure 5:
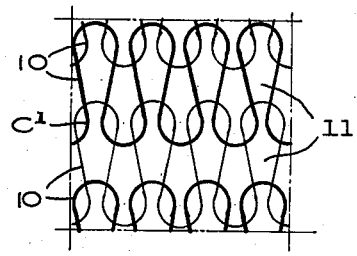
Figure 5 is an enlarged view of a fragmentary portion of the casing.

In its structural features, the cleaning unit consists of casing $C^1$ having a sponge rubber block $C^2$ disposed on the interior thereof. The casing is made of an open mesh plastic material, such as illustrated on an enlarged scale in Figure 5. As shown in this view, the threads 10 are interwoven one with the other so as to produce interstices 11 in the casing. This casing is relatively soft so that it will not injure the gums of a person, yet it will clean the teeth very efficiently. All six faces of the block $C^2$ are covered by the casing $C^1$. The block, since it is made from sponge rubber, will yield so as to fit into irregular surfaces of the teeth. Of course, the block will collect particles of food and the like, which are removed from the person's teeth during the cleaning operation.

Figure 1:
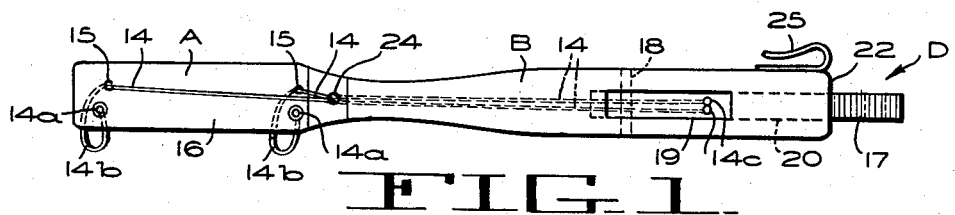
Figure 1 is a plan view of the tooth brush, looking at the back thereof, and with the casing and rubber sponge block of the cleaning unit being omitted.

As shown in the drawing, the casing $C^1$ and the sponge rubber block $C^2$ are disposed on the front surface 12 of the head A. The cleaning-unit securing mechanism D includes a pair of cords 14, each having its forward end 14a anchored to the head A, as disclosed in Figure 1. Moreover, each cord defines a loop 14b which is adapted to extend around the casing and sponge rubber block for removably securing the casing and block to the head A. The latter is fashioned with openings 15 through which the cords 14 extend to the back surface 16 of the head. Both cords 14 extend generally lengthwise of the handle B and have their rear ends 14c anchored to a swingably-mounted lever 17, which forms part of the cleaning-unit securing mechanism D.

The lever 17 has one end thereof swingably secured by a hinge pin 18 to the handle B. The rear ends 14c of the cords 14 are anchored to the lever 17 at a point removed from the hinge pin 18. The lever is swingable into the full-line position shown in Figure 2 so as to draw the cords 14 taut and thereby bring the loops 14b into embracing relation with the casing $C^1$ and the sponge rubber block $C^2$, thus holding them up against the front surface 12 of the head A. However, the lever is swingable in the opposite direction, as suggested by the dot-dash lines in Figure 2, so as to free the casing and block for removal from the head.

It will be noted that the handle B has an opening 19 fashioned therein for accommodating the forwarded end of the lever 17, that is, the end in which the hinge pin 18 is arranged. Also, the handle is formed with a recess 20 in its front face 21, which extends from the opening 19 to the rear end 22 of the handle. This recess is adapted to receive part of the lever 17 when the latter is swung into the full-line position shown in Figure 2. The lever 17 has a hook 23 thereon, which is positioned to engage with the rear end 22 of the handle, when the lever is swung in a direction to draw the cords taut upon the casing $C^1$ and the block $C^2$, that is, into the full line position illustrated.

The intermediate sections of the cords 14 are guided through an opening 24 fashioned in the handle B. This arrangement allows the forward portions of the cords 14 to extend along the back surfaces 16 of the head A, while the rear portions of these cords extend along the front face 21 of the handle so as to extend to the lever 17. A hook 25 may be provided on the handle so that the tooth brush may be hung up, if desired.

Summary of operation

Figure 2:
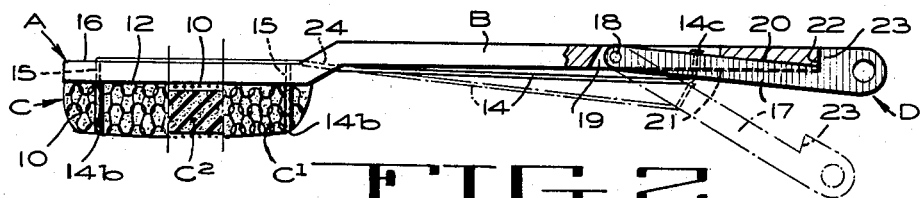
Figure 2 is a side elevation view of the complete tooth brush and cleaning unit, parts being shown in section.
Figure 3:
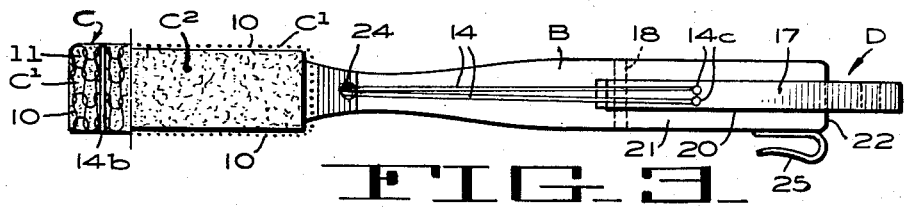
Figure 3 is a plan view looking at the front of the tooth brush, part of the casing being broken away.
Figure 4:
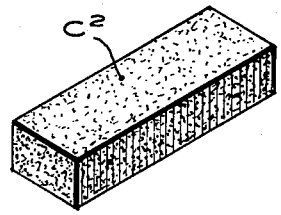
Figure 4 is an isometric view of the sponge rubber block.

Assuming that the sponge rubber block $C^2$ has been encased in the casing $C^1$ so as to provide the cleaning unit C, the first step in applying this unit is to swing the lever 17 into the dot-dash line position shown in Figure 2. This will allow the cleaning unit C to be inserted through the loops 14b with the unit being positioned against the front surface 12 of the head A. At this time, the lever 17 may be swung into the full line position disclosed in Figure 2, thereby causing the cords 14 to be drawn taut and the loops 14b being contracted until the casing and the block are firmly drawn up against the head.

In using the assembled device, the soft plastic threads 10 of the casing $C^1$ will remove food particles and the like from the person's teeth, and the block $C^2$ will yield so as to allow the casing to extend into irregular portions of the teeth. The sponge rubber block will assist in the cleaning operation and will collect the food particles and the like. The cleaning unit C may be readily replaced from time to time with facility and ease.

I claim:

1. In a tooth brush: a head having a handle extending therefrom; a casing disposed on one surface of the head, and being made of an open-mesh plastic material; a sponge rubber block disposed within the casing, and being exposed through the interstices of the mesh; a pair of cords guided through openings in the head; the cords defining loops extending around the casing and the sponge rubber block for removably securing the casing and the block to the head when the loops are constricted; and means operable for constricting and drawing the loops into embracing relation with the casing and the block.

2. In a tooth brush: a head having a handle extending therefrom; a casing disposed on one surface of the head, and being made of an open-mesh plastic material; a sponge rubber block disposed within the casing, and being exposed through the interstices of the mesh; a pair of cords, each having one end thereof anchored to the head; each cord defining a loop extending around the casing and the sponge rubber block for removably securing the casing and the block to the head; a lever having one end thereof swingable secured by a hinge pin to the handle; each of the cords extending generally lengthwise of the handle and having an end anchored to the lever at a point removed from the hinge pin of the lever; the lever being swingable in one direction to draw the cords taut and thereby bring the cords into embracing relation with the casing and the block; the lever being swingable in the opposite direction to free the casing and block for removal from the head.

3. The tooth brush, as defined in claim 2; and in which the lever is fashioned with a hook arranged to engage with one end of the handle, when the lever is swung in a direction to draw the cords taut upon the casing and block.

4. The tooth brush, as defined in claim 2; and in which the intermediate sections of the cords are guided through an opening fashioned in the handle.

References Cited in the file of this patent

UNITED STATES PATENTS

| | | |
|---|---|---|
| 92,298 | Francis | July 6, 1869 |
| 1,063,214 | Rankin | June 3, 1913 |
| 2,601,771 | Cameron | July 1, 1952 |
| 2,804,728 | Politzer | Sept. 3, 1957 |

FOREIGN PATENTS

| | | |
|---|---|---|
| 404,890 | France | Dec. 14, 1909 |
| 1,070,031 | France | Feb. 17, 1954 |